(12) United States Patent
Takatsu et al.

(10) Patent No.: US 9,456,029 B2
(45) Date of Patent: Sep. 27, 2016

(54) COMMAND PROCESS LOAD BALANCING SYSTEM

(71) Applicant: International Business Machines Corporation, Armonk, NY (US)

(72) Inventors: Noriaki Takatsu, Tokyo (JP); Atsushi Yokoi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 14/089,032

(22) Filed: Nov. 25, 2013

(65) Prior Publication Data

US 2014/0173117 A1    Jun. 19, 2014

(30) Foreign Application Priority Data

Dec. 19, 2012 (JP) ................. 2012-276610

(51) Int. Cl.
*H04L 29/08* (2006.01)

(52) U.S. Cl.
CPC ....... *H04L 67/1002* (2013.01); *H04L 67/1004* (2013.01); *H04L 67/1008* (2013.01)

(58) Field of Classification Search
CPC . G06F 9/50; H04L 67/1002; H04L 67/1004; H04L 67/1008
See application file for complete search history.

(56) References Cited

U.S. PATENT DOCUMENTS

| 7,346,693 | B2 | 3/2008 | Shimada |
| 8,176,076 | B2 | 5/2012 | Iwamoto |
| 2005/0081211 | A1* | 4/2005 | Koga ............... G06F 9/5055 718/105 |
| 2006/0253457 | A1* | 11/2006 | Takahashi ......... G06F 17/3089 |
| 2008/0184255 | A1* | 7/2008 | Watanabe ........... G06F 9/505 718/105 |

FOREIGN PATENT DOCUMENTS

| JP | 07319835 | | 12/1995 |
| JP | 2000194566 | A | 7/2000 |
| JP | 2004192233 | A | 7/2004 |
| JP | 2007233946 | A | 9/2007 |
| JP | 2009140319 | A | 6/2009 |
| JP | 2009237748 | A | 10/2009 |

* cited by examiner

*Primary Examiner* — Chris Parry
*Assistant Examiner* — Daeoo Lee
(74) *Attorney, Agent, or Firm* — Cantor Colburn LLP; Maeve Carpenter

(57) ABSTRACT

A command process load balancing system performs load balancing of received commands among a number of server processes to resolve access contention for virtual software resources. These contentions are resolved through a history recording unit that records a history including contents of a processed command and a response time of a process for the command into a history database. A prediction unit predicts, in a case where a set of commands to be processed is assigned to a server process, whether or not a load that is equal to or higher than a reference value is applied, on the basis of the history recorded in the history database. An assigning unit assigns at least one command included in the set of commands to be processed to a different server process, in accordance with prediction that a load that is equal to or higher than the reference.

20 Claims, 8 Drawing Sheets

COMMAND PROCESS LOAD BALANCING SYSTEM

PRIORITY

This application claims priority to Japanese Patent Application No. 2012-276610, filed Dec. 19, 2012, and all the benefits accruing therefrom under 35 U.S.C. §119, the contents of which in its entirety are herein incorporated by reference.

BACKGROUND

The present invention relates to information processing and, more specifically, to a command process load balancing system that resolves contention for access to virtual software resources.

Command process systems have been developed for load balancing taking into consideration the usage rate of hardware resources of server processes. However, when a server processes a set of similar commands consecutively, contention may develop for accesses to virtual software resources. There is continuing need for a command process load balancing system that resolves contention for access to virtual software resources.

SUMMARY

According an embodiment, an information processing system performs load balancing of received commands among a number of server processes. The system includes a history recording unit that records a history including contents of a processed command and a response time of a process for the command into a history database. A prediction unit predicts, in a case where a set of commands to be processed is assigned to a server process, whether or not a load that is equal to or higher than a reference value is applied, on the basis of the history recorded in the history database. An assigning unit assigns at least one command included in the set of commands to be processed to a different server process, in accordance with prediction that a load that is equal to or higher than the reference value is applied to the process for the set of commands. Embodiments of the invention may include a computer program product and an information processing method for use in the above-described information processing system.

The above brief description does not list all the features of the representative embodiments. In addition, sub-combinations of a group of these features may also constitute embodiments of the invention.

DETAILED DESCRIPTION

Embodiments may be realized in a command process load balancing system that performs load balancing of received commands among a number of server processes. When a set of similar commands are consecutively processed by a server process, contention can develop for accesses to virtual software resources. These contentions are resolved through a history recording unit that records a history including contents of a processed command and a response time of a process for the command into a history database. A prediction unit predicts, in a case where a set of commands to be processed is assigned to a server process, whether or not a load that is equal to or higher than a reference value is applied, on the basis of the history recorded in the history database. An assigning unit assigns at least one command included in the set of commands to be processed to a different server process, in accordance with prediction that a load that is equal to or higher than the reference.

Illustrative embodiments are described below. However, the embodiments described below do not limit the scope of claims of the invention. Furthermore, all the combinations of the features described in the embodiments are not essential to solve the problem addressed above.

Figure 1:
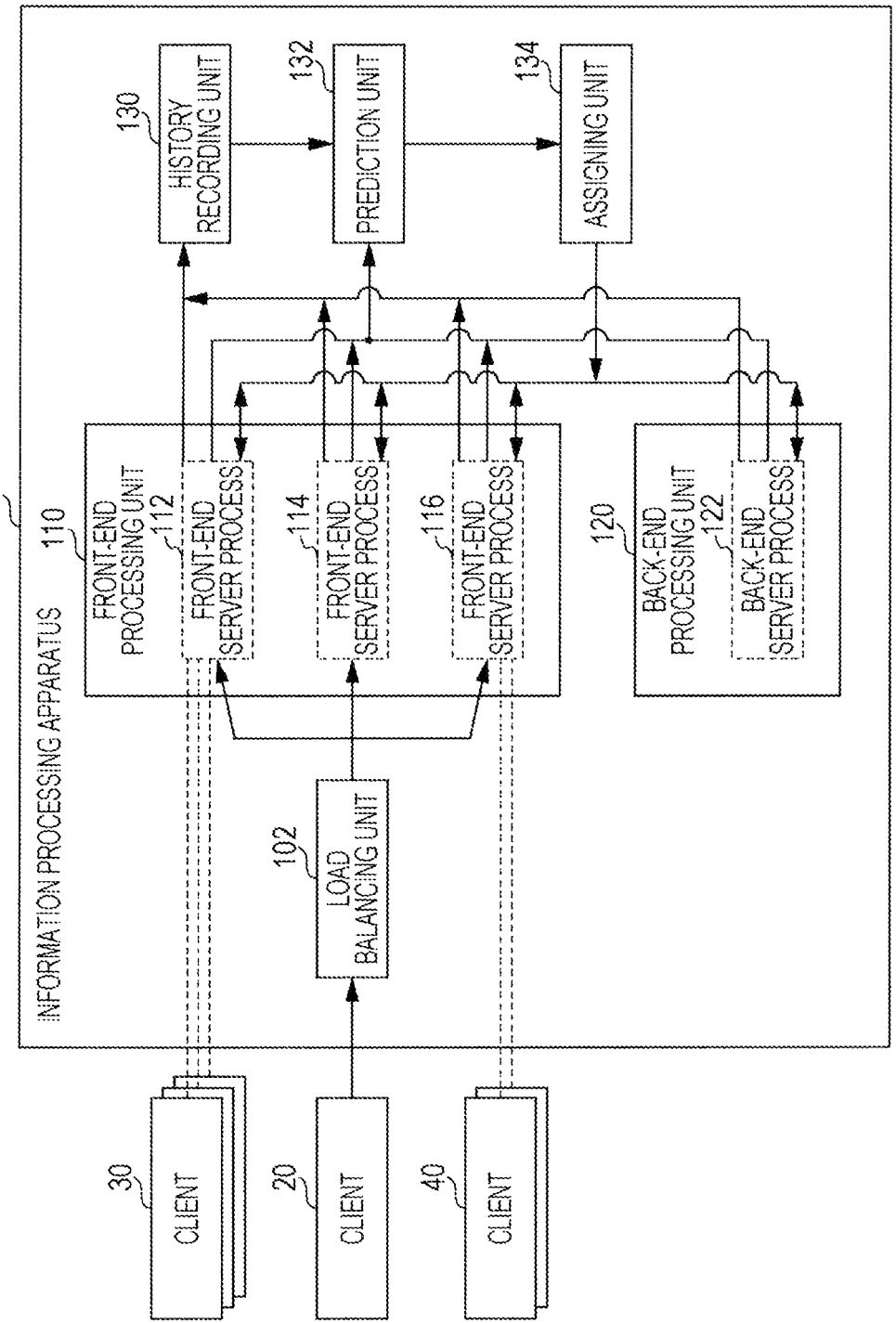
FIG. 1 illustrates the configuration of a command process load balancing system according to an embodiment of the present invention.

FIG. 1 illustrates the configuration of an information processing apparatus 10 implementing a command process load balancing system according to an embodiment of the invention for a plurality of clients 20, 30, and 40. The information processing apparatus 10 performs load balancing of commands received from the plurality of clients (20, 30, and 40 in this example) among a plurality of server processes. The information processing apparatus 10 predicts load on the basis of history information in accordance with the combination of commands executed by individual server processes, and reduces contention mainly on software, which occurs in server processes depending on the combination of commands.

The clients (20, 30, and 40 in this example) each allow a user to perform operation on a graphical user interface (GUI) or a character user interface (CUI), and transmit a command (or a set of commands) corresponding to the operation to the information processing apparatus 10. Each of the clients (20, 30, and 40 in this example) may be a computer terminal, a portable information terminal, or the like, and may execute a client server program by executing a client process corresponding to a server process.

The information processing apparatus 10 receives commands from the clients (20, 30, and 40 in this example). The information processing apparatus 10 may be, for example, a server computer that receives commands from the clients (20, 30, and 40 in this example) and performs processing corresponding to the commands. The information processing apparatus 10 may be an information system including a plurality of server computers.

The information processing apparatus 10 includes a front-end processing unit 110, a load balancing unit 102, a back-end processing unit 120, a history recording unit 130, a prediction unit 132, and an assigning unit 134.

The load balancing unit 102 performs load balancing of the plurality of clients (20, 30, and 40 in this example) among a plurality of front-end server processes 112 and so on (112, 114, and 116) performed by the front-end processing unit 110. For example, the load balancing unit 102 receives a log-in request from the client (client 20 will be referenced in the following description as a representative client) that has not been assigned to any server process, and performs a log-in process.

Then, the load balancing unit 102 assigns the client 20 to any one of the plurality of front-end server processes 112 and so on that are performed by the front-end processing unit 110, which will be described later. The load balancing unit 102 supplies to the front-end processing unit 110 information on the front-end server process to which the client 20 is assigned.

The front-end processing unit 110 performs the plurality of front-end server processes 112 and so on, each of which receives a command from at least one of the clients (20, 30, and 40 in this example). For example, the front-end processing unit 110 receives a command or a set of commands from each of the plurality of clients (20, 30, and 40 in this example), and performs, using one or a plurality of central processing units (CPUs) provided in the information processing apparatus 10, processes for commands from the plurality of clients (20, 30, and 40 in this example) in parallel or simultaneously.

In individual processes of the plurality of front-end server processes 112 and so on, the front-end processing unit 110 processes commands from clients assigned to the corresponding front-end server process 112 and so on. In FIG. 1, the front-end processing unit 110 processes at least one command or at least one set of commands (referred to as a "reception command") received from three clients 30 assigned to the front-end server process 112, and processes a reception command received from two clients 40 assigned to the front-end server process 116.

The front-end processing unit 110 transmits the results of processes for commands by the front-end server processes 112 and so on to the clients assigned to the corresponding front-end server processes 112 and so on. The front-end processing unit 110 may also be capable of transferring commands assigned to the front-end server processes 112 and so on to front-end server processes 112 and so on that are different from the front-end server processes 112 and so on to which the commands have been assigned.

Furthermore, the front-end processing unit 110 may transfer to a back-end server process 122 of the back-end processing unit 120 at least one command of reception commands assigned to the front-end server processes 112 and so on and may receive the result of the process for the command from the back-end server process 122. Furthermore, the front-end processing unit 110 supplies a history including the contents of a processed command, the execution time for the command, the response time of the process for the command to the history recording unit 130.

The back-end processing unit 120 performs the back-end server process 122. In the back-end server process 122, the back-end processing unit 120 receives transfer of a processing request for at least one command from the front-end server processes 112 or the like, performs the command, and transmits the result of the process for the command to the front-end server processes 112 or the like, which is a request source. The front-end server process 112 also supplies the contents of the processed command, the execution time for the command, and the response time of the process for the command to the history recording unit 130.

The history recording unit 130 receives a history including the contents of a processed command, the execution time for the command, and the response time of the process for the command from each of the front-end processing unit 110 and the back-end processing unit 120, and records the history into a history database. The history recording unit 130 records the contents of a command, the execution time, and the response time in association with one another in a history.

The prediction unit 132 predicts whether or not a load that is equal to or higher than a reference value is applied in the case where a set of commands to be processed is assigned to the front-end server process 112 or the like, on the basis of the histories recorded in the history database of the history recording unit 130. For example, the prediction unit 132 may predict load by predicting whether or not a response time that is equal to or longer than a reference time is required in the case where a set of commands to be processed is assigned to the front-end server process 112 or the like.

Furthermore, for example, in the case where a load that is equal to or higher than the reference value is applied when a set of commands is assigned to the front-end server process 112 or the like, the prediction unit 132 may predict, in a case where at least one command included in the set of commands to be processed is assigned to the front-end server process 114 or the like, which is different from the front-end server process 112 or the like, whether or not the load of the different front-end server process 114 or the like is equal to or higher than the reference value. The prediction unit 132 supplies the result of the prediction to the assigning unit 134.

The assigning unit 134 assigns, in accordance with the prediction by the prediction unit 132 that a load that is equal to or higher than the reference value is applied in the case where a set of commands to be processed is assigned to the front-end server process 112 or the like, at least one command included in the set of commands to be processed by the front-end server process 112 or the like to a different server process or the like.

For example, the assigning unit 134 may assign at least one command included in a set of commands to be processed by the front-end server process 112 or the like to the front-end server process 114 or the like, which is different from the front-end server process 112 or the like, or to the back-end server process 122 or the like.

As described above, after a reception command is received from a client, in the case where it is predicted that the response time for a set of commands to be processed by the front-end server process 112 or the like is equal to or longer than the reference time, the information processing apparatus 10 assigns a process for at least one command to a different server process. Accordingly, with the information processing apparatus 10, the front-end server process 112 or the like is prevented from processing a set of commands for which it is predicted that the load becomes higher, and occurrence of contention, which is mainly according to the combination of commands or the like, can be suppressed.

For example, in existing client server programs, when a server computer processes a specific combination of commands in a thread performed by one server process, access may be concentrated on a virtual resource, such as a control block or the like that manages a queue processing a request or a storage, and contention may occur, thus the response being degraded.

For example, in the case where a server computer processes a command for executing "Get" and "Free" for a storage a large number of times, such as several thousand times per second, even if the usage rate of the storage (hardware resource) itself is low, access concentration on a control block that manages the storage may cause contention. Thus, the response time for the command is increased. The information processing apparatus 10 according to an embodiment of the invention is capable of handling load generated by a specific combination of commands, apart from load balancing corresponding to the usage rate of hardware resources, and such contention is prevented from occurring.

Figure 2:
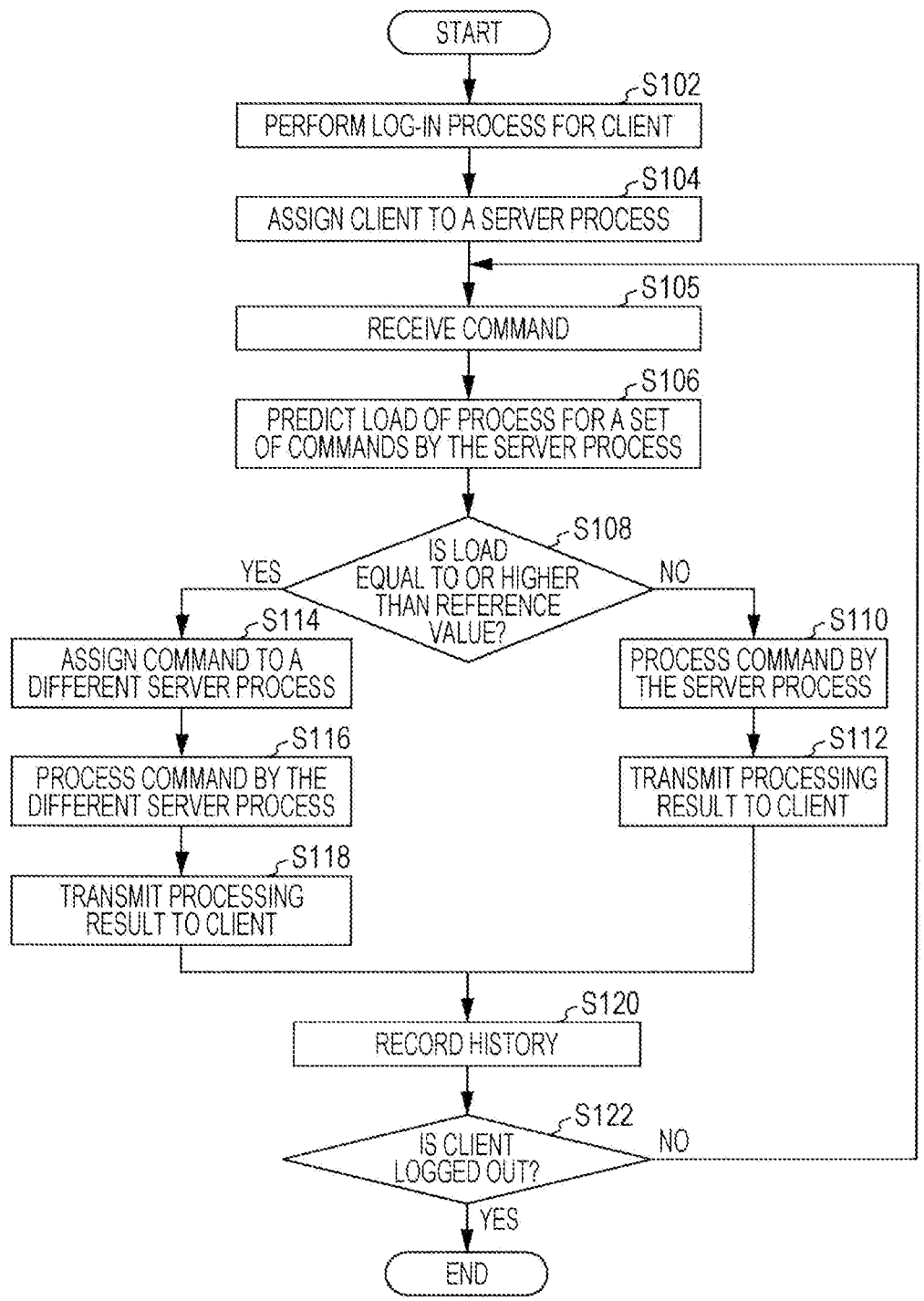
FIG. 2 illustrates a first flow of an information process performed by the command process load balancing system according to an embodiment of the invention.

FIG. 2 illustrates a first flow of an information process performed by the information processing apparatus 10 according to an embodiment of the invention. The flow in which, in the case where it is determined that the response time is equal to or longer than a reference time when a command from a client is assigned to the front-end server process 112 or the like, the front-end server process 114 or the like, which is different from the front-end server process 112 or the like, is caused to perform a process for at least one command is illustrated in FIG. 2. By performing processing of S102 to S122, the information processing apparatus 10 performs load balancing of received commands among the plurality of front-end server process 112 and the like.

In S102, the load balancing unit 102 receives, by performing a daemon process on the information processing apparatus 10, a long-in request from the client 20 that has not been assigned to any server process, and performs the log-in process for the client 20.

In S104, the load balancing unit 102 assigns the client 20 to the front-end server process 112 from among the plurality of front-end server processes 112 and so on that are performed by the front-end processing unit 110. The load balancing unit 102 supplies information on the front-end server process 112, to which the client 20 is assigned, to the front-end processing unit 110.

In S105, the front-end processing unit 110 receives commands from the client 20. For example, the front-end processing unit 110 receives a reception command corresponding to a user operation for the client 20.

For example, the front-end processing unit 110 receives from the client 20, a set of commands including commands A to E, as a set of commands to open a file (dataset) stored in the information processing apparatus 10.

Command A: C_GET_MEMBER_ATTRIBUTE: parameter=dataset name with member name

Command B: C_LIST_DATASET: parameter=dataset name

Command C: C_QUERY_DATASETS: parameter=hlq

Command D: C_LOCK_AND_DOWNLOAD_MEMBER: parameter=dataset name with member name

Command E: C_GET_MEMBER_ATTRIBUTE: parameter=dataset name with member name

As another example, the front-end processing unit 110 specifies, using a filter, a file (dataset) starting from TAKATSU, and receives from the client 20 a set of commands F to H, as a set of commands to search for a character string test in the file (dataset).

Command F: C_SEARCH: parameter=filter (e.g. TAKATSU.*), search string=test*

Command G: C_GET_MEMBER_ATTRIBUTE: parameter=dataset name with member name

Command H: C_LIST_DATASET: parameter=dataset name

The front-end processing unit 110 may receive a command including the type of the command and a parameter. For example, in command A, "C_GET_MEMBER_ATTRIBUTE" represents the type of the command, and "dataset name with member name" represents a parameter. The front-end processing unit 110 supplies received one or more commands to the prediction unit 132.

In S106, the prediction unit 132 predicts, in the case where the set of commands to be processed is assigned to the front-end server process 112 (for example, the front-end server process to which the client is assigned), whether or not a response time that is equal to or longer than a reference time is required for the front-end server process 112, on the basis of the histories recorded in the history database of the history recording unit 130.

Here, the prediction unit 132 may predict load for (1) the reception command newly received in S105 or (2) a set of commands generated by adding the reception command to the set of commands that is being processed by the front-end server process 112, as the set of commands to be processed.

For example, the prediction unit 132 searches the history database for a command that is the same as or similar to each command included in the set of commands to be processed (referred to as a similar command). In the case where a history representing that a set of similar commands including only similar commands corresponding to at least some commands of the set of commands to be processed were performed in the same period exists, the prediction unit 132 compares the load of the response time or the like for individual similar commands in that case with the load for the individual similar commands in the case where a different combination obtained by replacing some similar commands of the set of similar commands with commands other than similar commands is performed.

More specifically, the comparison between the response time in the case where a set of similar commands corresponding to the set of commands to be processed is performed (in the case where a plurality of response times exist, the average response time or the maximum/minimum response time, referred to as a "similar command pattern response time") and the response time in the case where a different combination of commands is performed (referred to as a "different command pattern response time"), and it is predicted whether or not the obtained result is equal to or greater than a reference value.

For example, by determining whether or not the similar command pattern response time is equal to or longer than the time obtained by multiplying the different command pattern response time by a certain coefficient, the prediction unit 132 determines whether or not a response time that is equal to or longer than a predetermined reference time is required in the case where the set of commands to be processed is assigned to the front-end server process 112. The prediction unit 132 supplies the result of the prediction to the assigning unit 134.

Furthermore, the prediction unit 132 may detect in advance a specified combination of two commands/a set of commands whose response time reaches the reference time or longer when the specified combination of two commands/a set of commands are performed in the same period, on the basis of the history database of the history recording unit 130. The combination of commands/a set of commands may be all or part of the set of processed commands, which are recorded in the history database. In the case where the set of commands to be processed includes the detected combination of two commands/a set of commands, it may be predicted that a response time that is equal to or longer than a reference time is required.

In the case where the prediction unit 132 has predicted in the processing of S106 that a response time that is equal to or longer than the reference time is required when the set of commands to be processed is assigned to the front-end server process 112 or the like in S108, the assigning unit 134 causes the process to proceed to S114 in order to assign a command to a different server process. In the case where a response time that is equal to or longer than the reference time is not required, the assigning unit 134 causes the process to proceed to S110 in order to complete the commands by the original server process.

In S110, the front-end processing unit 110 performs the front-end server process 112 assigned in the processing of S104 to process the received commands from the client 20.

In S112, the front-end processing unit 110 transmits, by the front-end server process 112 that has processed the commands, the processing results to the client 20.

In S114, the assigning unit 134 assigns at least one command included in the set of commands to be processed (referred to as an "assigned command") to the front-end server process 114 or the like, which is different from the front-end server process 112. For example, the assigning unit 134 assigns a newly received reception command among the set of commands to be processed to the different front-end server process 114 or the like. Alternatively, for example, the assigning unit 134 may assign a set of commands obtained by adding the set of commands being processed by the front-end server process 112 in front of the reception command to the different front-end server process 114 or the like.

For example, by transferring the assigned command from the front-end server process 112 assigned in the processing of S104 to the different front-end server process 114 or the like, the assigning unit 134 assigns the assigned command to the different front-end server process 114 or the like.

In S116, the front-end processing unit 110 performs the different front-end server process 114 or the like assigned in the processing of S114 to process the assigned command from the client 20.

Accordingly, the information processing apparatus 10 is capable of processing the assigned command by the different front-end server process 114 or the like while taking into consideration the response time for commands from the client 20 or the like assigned to the front-end server process 112 or the like.

In S118, the front-end processing unit 110 transmits the processing result to the client 20 by the different front-end server process 114 or the like that has processed the assigned command.

In S120, the front-end processing unit 110 records the contents of a command, such as the type of the processed command and a parameter, the execution time for the command, and the response time of the process for the command into the history recording unit 130.

In S122, the front-end processing unit 110 determines whether or not the client 20 has been logged out. In the case where it is determined that the client 20 has been logged out, the front-end processing unit 110 terminates the process. In the case where it is determined that the client 20 has not been logged out, the process returns to S105.

As described above, in the information processing apparatus 10, by performing the processing of S102 to S122, the prediction unit 132 predicts the response time for a command from the client 20 or the like by the front-end server process 112 on the basis of the histories in the history recording unit 130. In the case where the response time is equal to or longer than the reference time, the assigning unit 134 assigns a process for the command to a different server process.

Accordingly, with the information processing apparatus 10, the front-end server process 112 does not process a set of commands whose response time is long. For example, with the information processing apparatus 10, occurrence of contention generated in the case where a virtual resource, such as a control block that manages a queue processing a request or a storage, is accessed from threads performed by the front-end server process 112 and the like at the same time, can be reduced.

In S114 in the first flow, the assigning unit 134 may assign, instead of an assigned command, the client 20 itself assigned to the front-end server process 112 may be assigned to the different front-end server process 114 or the like. In this case, the information processing apparatus 10 may perform the subsequent processing for the different front-end server process 114 or the like to which the assigned command is assigned in the processing of S114 as a new front-end server process.

Figure 3:
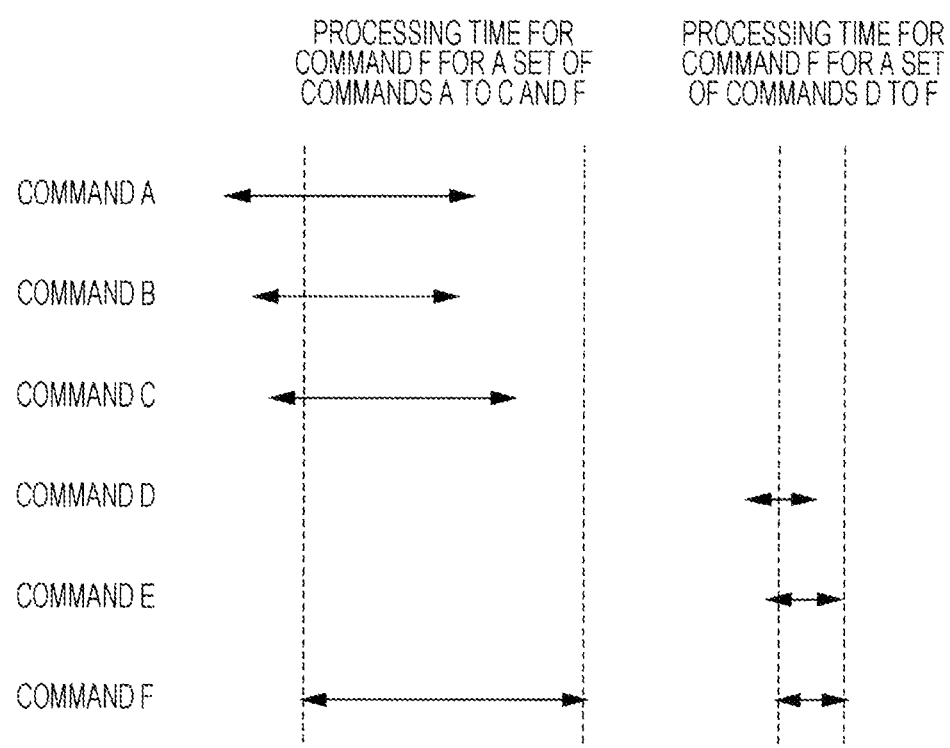
FIG. 3 illustrates processing times for a number of commands A to F performed by the command process load balancing system according to an embodiment of the invention.

FIG. 3 illustrates an example of processing times for the plurality of commands A to F by a front-end server process. For example, in the case where the commands A to C are a set of commands that are being processed by a front-end server process and the command F is a reception command that is newly received by the front-end server process, the commands A to C and F are a set of commands to be processed. In S106 of FIG. 2, the prediction unit 132 searches the history database of the history recording unit 130 for similar commands corresponding to the commands A to C and F, which are the set of commands to be processed.

The prediction unit 132 searches the history database for a history representing that a set of similar commands including at least one of similar commands A' to C' and F' corresponding to the commands A to C and F were performed in the same period. In the case where a history representing that a set of similar commands including only similar commands corresponding to at least some commands of the set of commands to be processed (for example, a set of commands A', B', C' and F' or a set of commands B', C', and F') were performed in the same period exists, the prediction unit 132 compares the similar command pattern response time for the similar commands in that case with the different command pattern response time for the similar commands in the case where a different combination obtained by replacing some similar commands of the set of similar commands with commands other than similar commands (for example, a set of A', B', C', and X or a set of commands D', E', and F') is performed.

FIG. 3 illustrates the state in which a relatively long response time is recorded in the history database in the case where the command F was processed together with the commands A to C and a relatively short response time is recorded in the history database in the case where the command F was processed together with the commands D and E.

In this case, the similar command pattern response time for the command F processed together with the commands A to C is longer than the different command pattern response time for the command F processed together with the commands D and E. As a result, for example, in the case where a certain coefficient multiplied by the different command pattern response time in S106 is 1.0, the prediction unit 132 predicts that a response time that is equal to or longer than a reference time is required in the case where the set of commands to be processed is assigned to the front-end server process 112 or the like.

Here, the prediction unit 132 may define a different command having a type and/or parameter similar to that of a command as a command similar to the command. Furthermore, in the case where the types of commands are the same or have a specific common keyword, the prediction unit 132 may define the types of the plurality of commands as being similar to one another. Furthermore, in the case where the names of files for commands and the names of folders in which the files exist are the same or have a specific common keyword, the prediction unit 132 may define the parameters of the plurality of commands as being similar to one another.

Furthermore, in the case where the sizes of files or databases are categorized according to the size and the sizes of files for commands or databases are categorized into the same category, the prediction unit 132 may define the parameters of the plurality of commands as being similar to one another. The prediction unit 132 may make a determination as to the similarity of a command type and a parameter, except for a user ID or the like corresponding to a user of the client 20.

Figure 4:
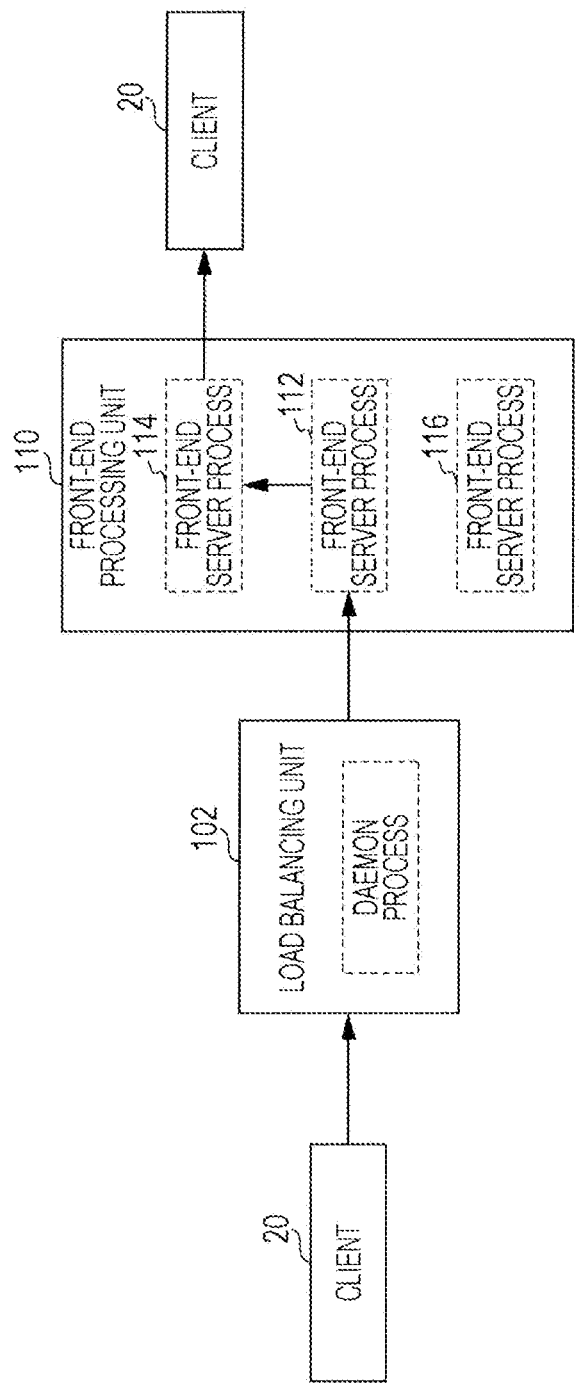
FIG. 4 illustrates the summary of the information process according to the flow illustrated in FIG. 2.

FIG. 4 illustrates the summary of the information process illustrated in FIG. 2. The load balancing unit 102 performs a log-in process for the client 20 by a daemon process, and assigns the client 20 to the front-end server process 112 from among the plurality of front-end server processes 112, 114, and 116.

For example, the load balancing unit 102 selects the front-end server process 112 from among the plurality of front-end server processes 112 and so on, on the basis of the load for the CPU, the memory usage rate, and/or the number of clients that are performing a command of each of the front-end server processes 112 and so on, and assigns the selected front-end server process 112 to the client 20.

The front-end server process 112 to which the client 20 is assigned receives a command/a set of commands as a reception command from the client 20, and transfers an assigned command included in the set of commands to be processed to the front-end server process 114, which is different from the front-end server process 112, in accordance with the result of the determination representing that the response time of the process for the set of commands to be processed including the reception command is equal to or longer than a reference time. The different front-end server process 114 processes the assigned command from the client 20, and transmits the processing result to the client 20.

Figure 5:
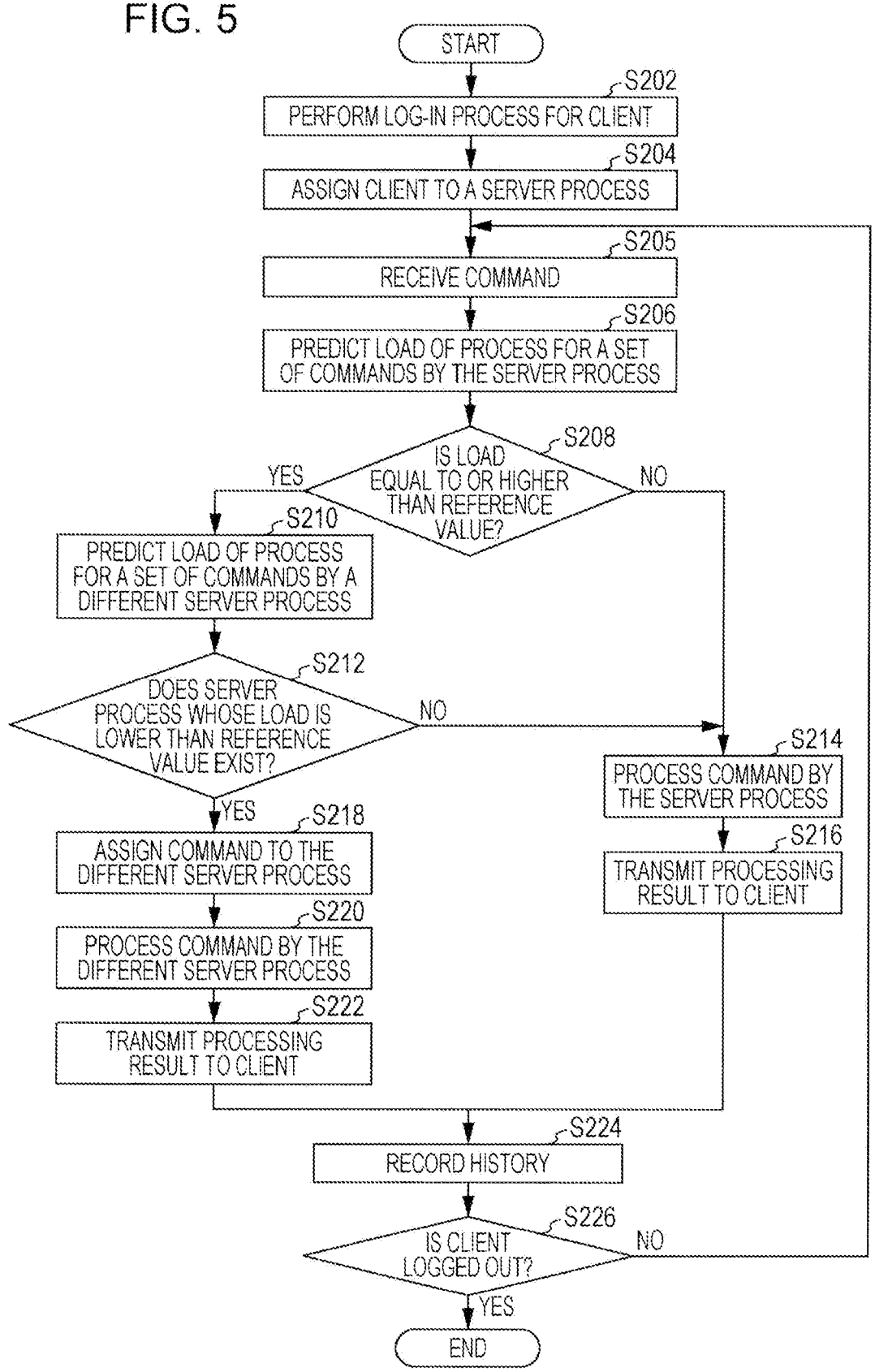
FIG. 5 illustrates a second flow of an information process performed by the command process load balancing system according to an embodiment of the invention.

FIG. 5 illustrates a second flow of an information process performed by the information processing apparatus 10 according to an embodiment of the invention. The flow in which, in the case where it is determined that the response time is equal to or longer than a reference time when a reception command received from a client is assigned to a front-end server process and the response time is shorter than the reference time when the reception command is assigned to a different front-end server process, the different front-end server process is caused to perform a process for a command included in the set of commands to be processed is illustrated in FIG. 5. In the second flow, by performing the processing of S202 to S226, the information processing apparatus 10 performs load balancing of received commands among a plurality of server processes.

In the second flow, the information processing apparatus 10 may perform the processing of S202 to S208 in conformity with the processing of S102 to S108 illustrated in FIG. 2.

In S210, the prediction unit 132 determines whether or not the front-end server process 114 or the like, which is different from the front-end server process 112 and whose response time is shorter than the reference time when a set of commands to be processed is assigned to the different front-end server process 114 or the like, exists, on the basis of the histories recorded in the history database of the history recording unit 130.

For example, the prediction unit 132 predicts, in the case where a set of commands generated by adding the reception command received by the front-end server process 112 in S205 to the set of commands being processed by the different front-end server process 114 or the like is assigned, as a set of commands to be processed, to the different front-end server process 114 or the like, whether or not a response time that is equal to or longer than the reference time is required for the different front-end server process 114 or the like.

Similar to the processing of S106, the prediction unit 132 performs the prediction on the basis of the histories recorded in the history database of the history recording unit 130. The prediction unit 132 performs the prediction for each of the front-end server process 114 and the like, which are different from the front-end server process 112. The prediction unit 132 supplies to the assigning unit 134 the result of the prediction as to whether or not the different front-end server process 114 or the like to which a load that is equal to or higher than the reference value is not applied exists.

In the case where the result of the prediction by the prediction unit 132 in S212 represents that "the different front-end server process 114 or the like to which a load that is equal to or higher than a reference value is not applied exists", the assigning unit 134 causes the process to proceed to S218. In the case where the result of the prediction does not represent that "the different front-end server process 114 or the like to which a load that is equal to or higher than a reference value is not applied exists", the assigning unit 134 causes the process to proceed to S214.

In the second flow, the information processing apparatus 10 may perform the processing of S214 to S226 in conformity with the processing of S110 to S122 illustrated in FIG. 2.

As described above, in the information processing apparatus 10, by performing the processing of S202 to S226, on the condition that the prediction unit 132 has predicted that even when at least one command included in a set of commands to be processed is assigned to the different front-end server process 114 or the like, the load to be applied to the different front-end server process 114 or the like is lower than the reference value, the assigning unit 134 assigns the at least one command to the different front-end server process 114 or the like.

Accordingly, on the basis of the prediction as to the response time for a command by the different front-end server process 114 or the like, to which assigning is performed, as well as by the front-end server process 112, from which assigning is performed, the information processing apparatus 10 assigns the client to the different front-end server process 114 or the like. Thus, according to the information processing apparatus 10, the response time for a command by the server process to which assigning is performed can be reliably reduced.

Figure 6:
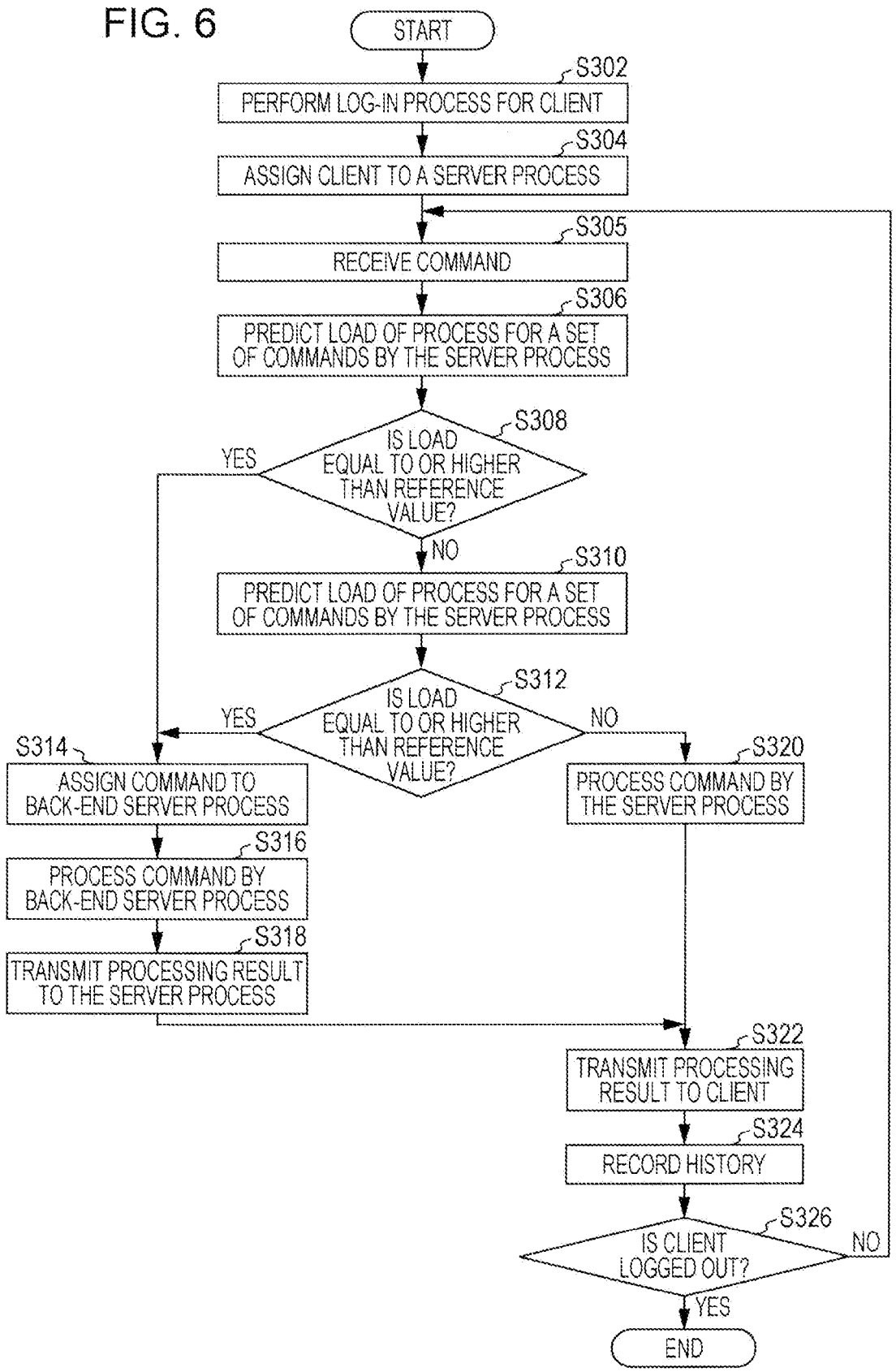
FIG. 6 illustrates a third flow of an information process performed by the command process load balancing system according to an embodiment of the invention.

FIG. 6 illustrates a third flow of an information process performed by the information processing apparatus 10 according to an embodiment of the invention. The flow in which, in the case where it is determined that the response time is equal to or longer than a reference time when a reception command received from a client is assigned to a front-end server process, the back-end server process is caused to perform a process for a command included in a set of commands to be processed is illustrated in FIG. 6. In the third flow, by performing the processing of S302 to 326, the information processing apparatus 10 performs load balancing of received commands among a plurality of server processes.

In the third flow, the information processing apparatus 10 may perform the processing of S302 to S305 in conformity with the processing of S102 to S105 illustrated in FIG. 2.

In S306, the prediction unit 132 predicts, in the case where a newly received reception command is assigned to the front-end server process 112, whether or not a load that is equal to or higher than a reference value is applied to the front-end server process 112 by the process for the reception command itself.

For example, the prediction unit 132 calculates, on the basis of the reception command, instead of a set of commands to be processed, a similar command pattern response time corresponding to the reception command, as in S106, and predicts whether or not the similar command pattern response time is equal to or longer than the reference time.

The prediction unit 132 may use, as the reference time, a predetermined certain time or a time that differs from type to type of a set of commands. For example, the prediction unit 132 may use, as a reference time, a longer time for a set of commands including a large number of commands, and may use, as a reference time, a shorter time for a set of commands including a small number of commands. The prediction unit 132 supplies the result of the prediction to the assigning unit 134.

In the case where it is determined in S308 that the result of the prediction by the prediction unit 132 represents that the response time is equal to or longer than the reference time, the assigning unit 134 causes the process to proceed to S314. In the case where it is determined in S308 that the result of the prediction does not represent that the response time is equal to or longer than the reference time, the assigning unit 134 causes the process to proceed to S310.

In the third flow, the information processing apparatus 10 may perform the processing of S310 in conformity with the processing of S106 illustrated in FIG. 2.

In the case where it is determined in S312 that the result of the prediction by the prediction unit 132 represents that the response time is equal to or longer than the reference time, the assigning unit 134 causes the process to proceed to S314. In the case where it is determined in S312 that the result of the prediction does not represent that the response time is equal to or longer than the reference time, the assigning unit 134 causes the process to proceed to S320.

In S314, the assigning unit 134 assigns the process for the reception command received from the client 20 to the back-end server process performed by the back-end processing unit 120.

For example, by causing the front-end processing unit 110 to transfer the reception command from the front-end server process 112 assigned in the processing of S304 to the back-end server process 122, the assigning unit 134 assigns the set of commands to the back-end server process 122.

In S316, the back-end processing unit 120 performs the back-end server process 122 assigned in S314 to process the reception command.

In S318, the back-end processing unit 120 transmits the result of the process for the reception command by the back-end server process 122 to the front-end server process 112 assigned in S304.

In the third flow, the information processing apparatus 10 may perform the processing of S320 in conformity with the processing of S110 illustrated in FIG. 2.

In S322, the front-end processing unit 110 transmits, by the front-end server process 112, the result of the process in S316 or the result of the process in S320 to the client 20.

In the third flow, the information processing apparatus 10 may perform the processing of S324 and S326 in conformity with the processing of S120 and S122 illustrated in FIG. 2.

As described above, in the information processing apparatus 10, by performing the processing of S302 to S326, the assigning unit 134 assigns, in accordance with the prediction that the response time is equal to or longer than the reference time when a newly received reception command is assigned to the front-end server process 112, the process for the set of commands to the back-end server process 122 that is performed by the back-end processing unit 120.

Accordingly, the information processing apparatus 10 assigns the client to the back-end server process 122, on the basis of the prediction as to the processing load for the newly received reception command itself and the prediction as to the processing load for the set of commands to be processed, which is a combination of a command being processed and the received command. Thus, with the information processing apparatus 10, the processing load for a command by the server process to which assigning is performed can be reliably reduced.

Figure 7:
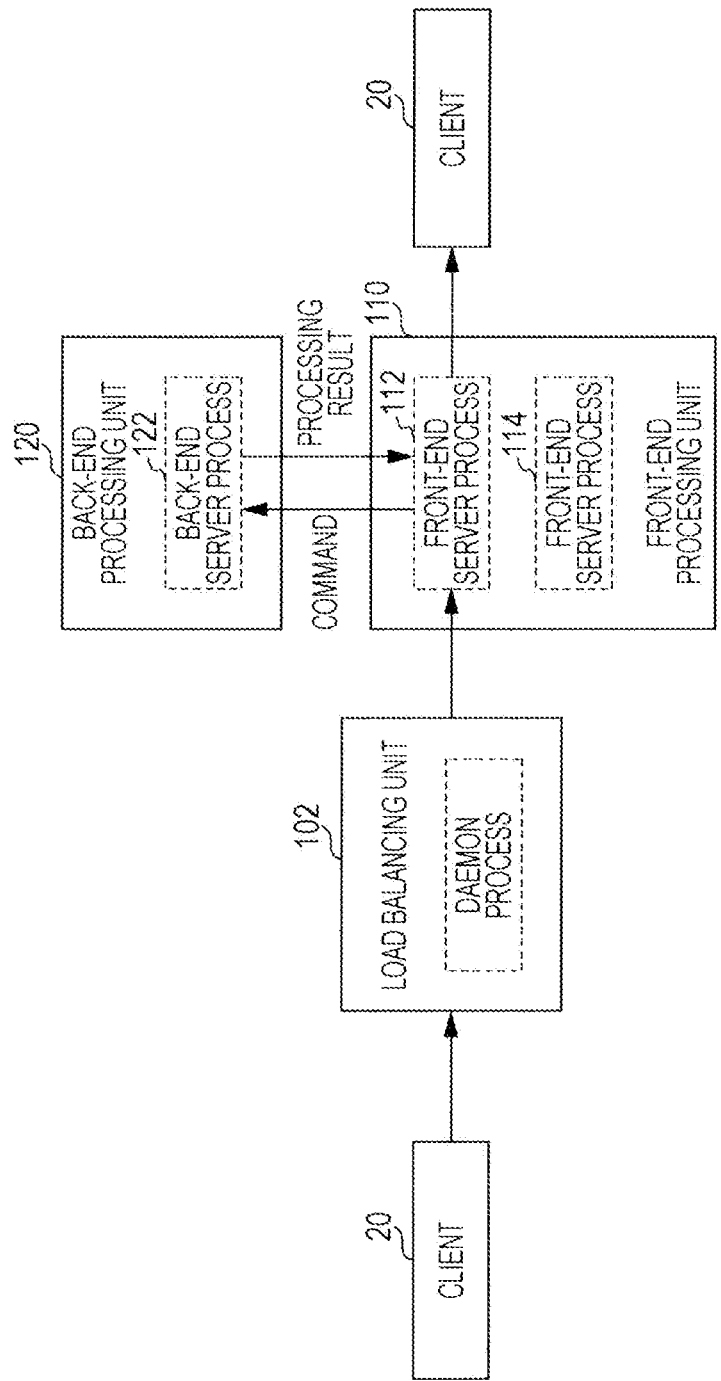
FIG. 7 illustrates the summary of the information process according to the flow illustrated in FIG. 6.

FIG. 7 illustrates the summary of the information process according to the flow illustrated in FIG. 6. As illustrated in FIG. 7, by a daemon process, the client 20 is assigned to the front-end server process 112 from among the plurality of front-end server processes 112, 114, and 116.

The front-end server process 112, to which the client 20 is assigned, receives a command/a set of commands as a reception command from the client 20, and transfers the reception command to the back-end server process 122 in accordance with the result of the determination representing that the response time of the process for the reception command is equal to or longer than the reference time. The back-end server process 122 processes the reception command, and transmits the processing result to the front-end server process 112. The front-end server process 112 transmits the received processing result to the client 20.

In an embodiment of the invention, the history recording unit 130 may record the CPU usage rate at the time of processing a command and/or the load of a hardware resource such as a disk load, as well as the contents of the processed command and the response time of the process for the command. In this case, the prediction unit 132 may determine whether or not a load that is equal to or higher than a reference value is applied to the front-end server process 112, on the basis of the load of the hardware resource as well as the response time.

Figure 8:
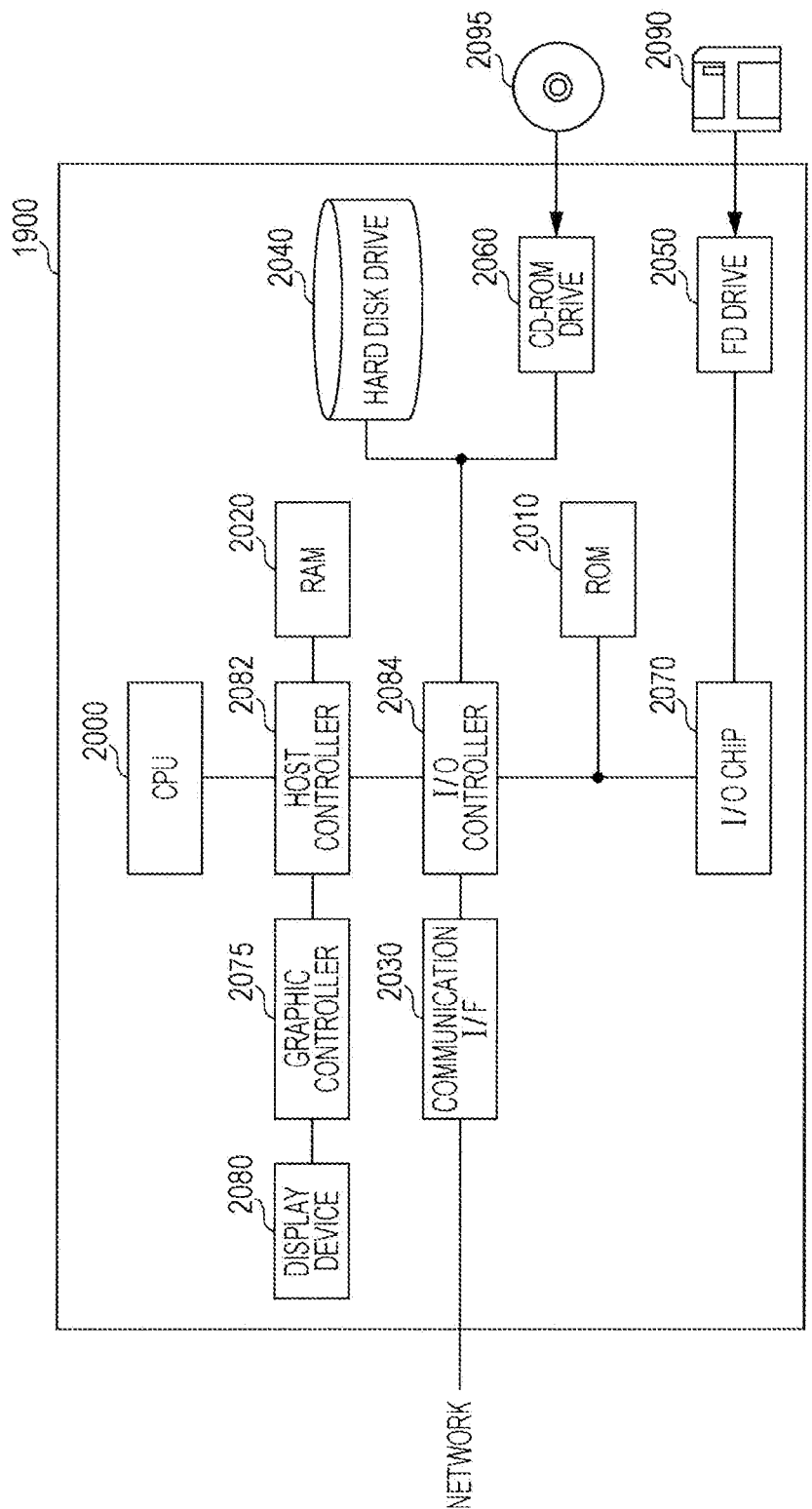
FIG. 8 illustrates an example of a computer hardware and computer program product configuration for implementing the command process load balancing system according to an embodiment of the present invention.

FIG. 8 illustrates an example of the hardware configuration of a computer 1900 that functions as the information processing apparatus 10 or the like. The computer 1900 according to an embodiment of the invention includes a CPU peripheral part including a CPU 2000, a RAM 2020, a graphic controller 2075, and a display device 2080 that are mutually connected by a host controller 2082, an input/ output unit including a communication interface 2030, a hard disk drive 2040, and a CD-ROM drive 2060 that are connected to the host controller 2082 via an input/output controller 2084, and a legacy input/output unit including a ROM 2010, a flexible disk drive 2050, and an input/output chip 2070 that are connected to the input/output controller 2084.

The host controller 2082 connects the RAM 2020 with the CPU 2000 and the graphic controller 2075 that access the RAM 2020 at a high transfer rate. The CPU 2000 operates according to programs stored in the ROM 2010 and the RAM 2020, and controls the various units. One or more CPUs 2000 may be provided. The graphic controller 2075 receives image data generated by the CPU 2000 or the like in a frame buffer arranged in the RAM 2020, and causes the acquired image data to be displayed on the display device 2080. Alternatively, the graphic controller 2075 may contain therein a frame buffer in which image data generated by the CPU 2000 or the like is generated.

The input/output controller 2084 connects the host controller 2082 with the communication interface 2030, the hard disk drive 2040, and the CD-ROM drive 2060, which are relatively high-speed input/output devices. The communication interface 2030 communicates with an external apparatus via a network in a wired or wireless manner. The communication interface 2030 functions as hardware that performs communication. The hard disk drive 2040 stores therein a program and data to be used by the CPU 2000 in the computer 1900. The CD-ROM drive 2060 reads a program or data from the CD-ROM 2095 and supplies the read program or data to the hard disk drive 2040 via the RAM 2020.

Furthermore, the ROM 2010, and the flexible disk drive 2050 and the input/output chip 2070, which are relatively low-speed input/output devices, are connected to the input/output controller 2084. The ROM 2010 stores therein a boot program that is executed at the time when the computer 1900 starts and/or a program depending on the hardware of the computer 1900. The flexible disk drive 2050 reads a program or data from the flexible disk 2090, and supplies the read program or data to the hard disk drive 2040 via the RAM 2020. The input/output chip 2070 connects the flexible disk drive 2050 with the input/output controller 2084, and connects various input/output devices with the input/output controller 2084 via, for example, a parallel port, a serial port, a keyboard port, a mouse port, or the like.

A program supplied via the RAM 2020 to the hard disk drive 2040 is stored in the flexible disk 2090, the CD-ROM 2095, or a recording medium such as an IC card and is supplied by a user. The program is read from the recording medium, is installed via the RAM 2020 into the hard disk drive 2040 in the computer 1900, and is executed by the CPU 2000.

The program that is installed into the computer 1900 and that causes the computer 1900 to function as the information processing apparatus 10 includes a front-end processing module, a load balancing module, a back-end processing module, a history recording module, a prediction module, and an assigning module. The program or modules may cause the CPU 2000 or the like to allow the computer 1900 to function as the front-end processing unit 110, the load balancing unit 102, the back-end processing unit 120, the history recording unit 130, the prediction unit 132, and the assigning unit 134.

By being read to the computer 1900, an information process described in the program functions as the front-end processing unit 110, the load balancing unit 102, the back-end processing unit 120, the history recording unit 130, the prediction unit 132, and the assigning unit 134, which are specific means obtained by cooperation between software and the above-mentioned various hardware resources. By realizing, with the specific means, arithmetic operation or processing on information corresponding to an intended purpose of the computer 1900 according to an embodiment of the invention, the special information processing apparatus 10 corresponding to the intended purpose can be constructed.

For example, in the case where communication is performed between the computer 1900 and an external apparatus or the like, the CPU 2000 executes a communication program loaded onto the RAM 2020, and instructs the communication interface 2030 to perform a communication process, on the bass of the processing contents described in the communication program. Under the control of the CPU 2000, the communication interface 2030 reads transmission data stored in a transmission buffer region or the like arranged in a storage device, such as the RAM 2020, the hard disk drive 2040, the flexible disk 2090, or the CD-ROM 2095 and transmits the read transmission data to the network or writes reception data received from the network into a reception buffer region or the like arranged in the storage device. As described above, the communication interface 2030 may transfer transmission/reception data to and from the storage device in a direct memory access (DMA) method. Alternatively, the CPU 2000 may transfer transmission/reception data by reading data from the storage device or the communication interface 2030, which is a transfer source, and writing the data to the communication interface 2030 or the storage device, which is a transfer destination.

Furthermore, the CPU 2000 causes all or a necessary part of a file or a database stored in an external storage device, such as the hard disk drive 2040, the CD-ROM drive 2060 (CD-ROM 2095), the flexible disk drive 2050 (flexible disk 2090), or the like to be read into the RAM 2020 by DMA transfer or the like, and performs various processes for the data in the RAM 2020. Then, the CPU 2000 writes the processed data back into the external storage device by DMA transfer or the like. In such processing, since the RAM 2020 can be regarded as temporarily storing therein the contents of the external storage device, the RAM 2020, the external storage device, and the like are generically referred to as a memory, a storing unit, a storage device, or the like in an embodiment of the invention. Various types of information on programs, data, tables, databases, and the like in an embodiment of the invention are stored in such a storage device and are subjected to information processes. The CPU 2000 may also be capable of storing part of the RAM 2020 in a cache memory and performing reading and writing on the cache memory. With such a configuration, since the cache memory is in charge of part of the function of the RAM 2020, the cache memory is also included in the RAM 2020, a memory, and/or the storage device in an embodiment of the invention, except for the case where the cache, the RAM 2020, the memory, and the storage device are distinguished from one another.

Furthermore, the CPU 2000 performs various types of processing including various arithmetic operations, processing of information, condition judgment, searching and replacement of information, and the like specified by an instruction sequence of a program and described in the above-described embodiments and for data read from the RAM 2020, and writes the processed data back to the RAM 2020. For example, in the case of condition judgment, the CPU 2000 determines whether each of various variables described in the above-described embodiments satisfies a condition of being greater than, smaller than, equal to or greater than, smaller than or equal to, or equal to a different variable or constant. In the case where the condition is satisfied (or is not satisfied), the CPU 2000 branches into a different instruction sequence or calls a subroutine.

Furthermore, the CPU 2000 is capable of searching for information stored in a file, a database, or the like in the storage device. For example, in the case where a plurality of entries in which a first type of attribute value is associated with a second type of attribute value are stored in the storage device, by searching for an entry that satisfies a condition on a specified first type of attribute value from among the plurality of entries stored in the storage device and reading the second type of attribute value stored in the entry, the CPU 2000 is capable of acquiring the second type of attribute value associated with the first attribute satisfying a specific condition.

The programs and modules described above may be stored in an external recording medium. As the recording medium, apart from the flexible disk 2090 and the CD-ROM 2095, an optical recording medium, such as a DVD or a CD, a magneto-optical medium, such as an MO, a tape medium, a semiconductor memory, such as or an IC card, or the like may be used. Furthermore, a storage device, such as a hard disk or a RAM, provided in a server system connected to a dedicated network or the Internet may be used as a recording medium, and a program may be supplied via the network to the computer 1900.

While the embodiments of the invention have been described above, the technical scope of the invention is not limited to the above-described embodiments. It is apparent to those persons skilled in the art that various alterations and improvements can be added to the above-described embodiments. It is also apparent from the scope of the claims that the embodiments added with such alterations or improvements can also be included in the technical scope of the invention.

It should be noted that the operations, procedures, steps, stages, and the like of each process performed by an apparatus, a system, a program, a program product, and a method illustrated in the claims, embodiments, or diagrams can be performed in any order as long as the order is not particularly indicated by "prior to," "before," or the like and as long as the output from a previous process is not used in a later process. Even if the operation flow is described using phrases, such as "first" or "next", in the claims, embodiments, or diagrams, it does not necessarily mean that processes must be performed in this order.

What is claimed is:

1. An information processing apparatus that performs load balancing of received commands among a plurality of server processes, comprising:
    at least one processor; and
    at least one memory storing computer-executable instructions comprising:
        a history recording unit executable by the at least one processor to record a history including contents of a first set of processed commands and a respective response time of a respective server process that handled each command in the first set of processed commands into a history database;
        a prediction unit executable by the at least one processor to:
            determine a second set of commands assigned to a first server process of the plurality of server processes;
            determine a first subset of processed commands of the first set of processed commands, each of the first subset of processed commands being similar to a respective corresponding command in the second set of commands;
            determine a second subset of processed commands by replacing a first processed command of the first subset of processed commands with a second processed command of the first set of processed commands, wherein the first processed command is similar to a particular command in the second set of commands and the second processed command is not similar to any command in the second set of commands;
            determine that a first command pattern response time associated with the first subset of processed commands is greater than or equal to a reference value, the reference value being based at least in part on a second command pattern response time associated with the second subset of processed commands; and
            predict that a response time associated with processing of the second set of commands by the first server process will be greater than or equal to the reference value; and
        an assigning unit executable by the at least one processor to assign, based at least in part on the prediction of the prediction unit, at least one command in the second set of commands to a second server process of the plurality of server processes, the second server process being different from the first server process.

2. The information processing apparatus according to claim 1, wherein the at least one command assigned to the second server process includes the particular command in the second set of commands.

3. The information processing apparatus according to claim 1, wherein the prediction unit is further executable by the at least one processor to:
    determine that the second set of commands includes a newly received reception command;
    determine a third processed command in the first subset of processed commands that is similar to the newly received reception command; and
    determine the second subset of processed commands by replacing each processed command in the first subset of processed commands other than the third processed command with a respective corresponding similar command from the first set of processed commands that is not similar to any command in the second set of commands, and
    wherein the at least one command assigned to the second server process includes the newly received reception command.

4. The information processing apparatus according to claim 1, wherein the prediction unit is further executable by the at least one processor to determine the reference value by multiplying the second command pattern response time by a coefficient.

5. The information processing apparatus according to claim 1, wherein the reference value is a first reference value, and wherein at least one command in the second set of commands is assigned to the second server process on a condition that a load of the second server process will be lower than a second reference value after the at least one command in the second set of commands is assigned to the second server process.

6. The information processing apparatus according to claim 1, the at least one memory further comprising:
- a front-end processing unit executable by the at least one processor to perform a plurality of front-end server processes of the plurality of server processes, the plurality of front-end server processes including the first server process; and
- a back-end processing unit executable by the at least one processor to perform the second server process, the second server process being a back-end server process,
- wherein the second server process sends a processing result of processing the at least one command in the second set of commands to the first server process.

7. The information processing apparatus according to claim 6, the at least one memory further comprising:
- a load balancing unit executable by the at least one processor to perform load balancing of a plurality of clients among the plurality of front-end server processes; and
- wherein the front-end processing unit is executable by the at least one processor to process a plurality of commands from the plurality of clients that are load-balanced among the plurality of front-end server processes by the load balancing unit.

8. The information processing apparatus according to claim 1, wherein the first command pattern response time is an average of a respective response time associated with processing of each command in the first subset of processed commands.

9. A computer program product for causing a computer to function as an information processing apparatus that performs load balancing of received commands among a plurality of server processes, the computer program product comprising a non-transitory computer readable storage medium having program code embodied therewith, the program code executable by a processor to cause the computer to function as:
- a history recording unit executable by the at least one processor to record a history including contents of a first set of processed commands and a respective response time of a respective server process that handled each command in the first set of processed commands into a history database;
- a prediction unit executable by the at least one processor to:
- determine a second set of commands assigned to a first server process of the plurality of server processes;
- determine a first subset of processed commands of the first set of processed commands, each of the first subset of processed commands being similar to a respective corresponding command in the second set of commands;
- determine a second subset of processed commands by replacing a first processed command of the first subset of processed commands with a second processed command of the first set of processed commands, wherein the first processed command is similar to a particular command in the second set of commands and the second processed command is not similar to any command in the second set of commands;
- determine that a first command pattern response time associated with the first subset of processed commands is greater than or equal to a reference value, the reference value being based at least in part on a second command pattern response time associated with the second subset of processed commands; and
- predict that a response time associated with processing of the second set of commands by the first server process will be greater than or equal to the reference value; and
- an assigning unit executable by the at least one processor to assign, based at least in part on the prediction of the prediction unit, at least one command in the second set of commands to a second server process of the plurality of server processes, the second server process being different from the first server process.

10. The computer program product according to claim 9, wherein the program code further causes the computer to function as:
- a front-end processing unit that performs a plurality of front-end server processes of the plurality of server processes, the plurality of front-end server processes including the first server process; and
- a back-end processing unit that performs the second server process, the second server process being a back-end server process,
- wherein the second server process sends a processing result of processing the at least one command in the second set of commands to the first server process.

11. The computer program product according to claim 10, wherein the program code further causes the computer to function as:
- a load balancing unit that performs load balancing of a plurality of clients among the plurality of front-end server processes; and
- wherein the front-end processing unit processes a plurality of commands from the plurality of clients that are load-balanced among the plurality of front-end server processes by the load balancing unit.

12. The computer program product according to claim 9, wherein the first command pattern response time is an average of a respective response time associated with processing of each command in the first subset of processed commands.

13. An information processing method for performing load balancing of received commands among a plurality of server processes, the method comprising:
- recording a history including contents of a first set of processed commands and a respective response time of a respective server process that handled each command in the first set of processed commands into a history database;
- determining a second set of commands assigned to a first server process of the plurality of server processes;
- determining a first subset of processed commands of the first set of processed commands, each of the first subset of processed commands being similar to a respective corresponding command in the second set of commands;
- determining a second subset of processed commands by replacing a first processed command of the first subset of processed commands with a second processed command of the first set of processed commands, wherein the first processed command is similar to a particular command in the second set of commands and the second processed command is not similar to any command in the second set of commands;
- determining that a first command pattern response time associated with the first subset of processed commands is greater than or equal to a reference value, the reference value being based at least in part on a second command pattern response time associated with the second subset of processed commands; and predicting that a response time associated with processing of the second set of commands by the first server process will be greater than or equal to the reference value; and assigning, based at least in part on the prediction of the prediction unit, at least one command in the second set of commands to a second server process of the plurality of server processes, the second server process being different from the first server process.

14. The method of claim 13, wherein the at least one command assigned to the second server process includes the particular command in the second set of commands.

15. The method of claim 13, further comprising:
determining that the second set of commands includes a newly received reception command; and
determining a third processed command in the first subset of processed commands that is similar to the newly received reception command,
wherein determining the second subset of processed commands by replacing each processed command in the first subset of processed commands other than the third processed command with a respective corresponding similar command from the first set of processed commands that is not similar to any command in the second set of commands, and
wherein the at least one command assigned to the second server process includes the newly received reception command
wherein in accordance with prediction that a load that is equal to or higher than the reference value is applied when a set of commands obtained by adding at least one newly received set of commands to the set of commands being processed by the server process is assigned to the server process, the assigning unit assigns the at least one newly received set of commands to the different server process.

16. The method of claim 13, further comprising determining the reference value by multiplying the second command pattern response time by a coefficient.

17. The method of claim 13, wherein the reference value is a first reference value, and wherein at least one command in the second set of commands is assigned to the second server process on a condition that a load of the second server process will be lower than a second reference value after the at least one command in the second set of commands is assigned to the second server process.

18. The method of claim 13, further comprising:
performing a plurality of front-end server processes of the plurality of server processes, the plurality of front-end server processes including the first server process; and
performing the second server process, the second server process being a back-end server process,
sending a processing result of processing the at least one command in the second set of commands from the second server process to the first server process.

19. The method of claim 18, further comprising:
performing load balancing of a plurality of clients among the plurality of front-end server processes; and
processing a plurality of commands from the plurality of clients that are load-balanced among the plurality of front-end server processes.

20. The method of claim 13, wherein the first command pattern response time is an average of a respective response time associated with processing of each command in the first subset of processed commands.

* * * * *